United States Patent [19]

Lee et al.

[11] 4,243,555
[45] * Jan. 6, 1981

[54] COMPOSITION FOR RECOVERY OF MG++ FROM BRINES

[75] Inventors: John M. Lee; William C. Bauman, both of Lake Jackson, Tex.

[73] Assignee: The Dow Chemical Company, Midland, Mich.

[*] Notice: The portion of the term of this patent subsequent to Sep. 26, 1995, has been disclaimed.

[21] Appl. No.: 71,920

[22] Filed: Aug. 31, 1979

Related U.S. Application Data

[62] Division of Ser. No. 939,544, Sep. 5, 1978, Pat. No. 4,183,900, which is a division of Ser. No. 812,542, Jul. 5, 1977, Pat. No. 4,116,857.

[51] Int. Cl.$^3$ ............................................. C01B 9/00
[52] U.S. Cl. .................................... 252/441; 210/687; 423/157; 423/463
[58] Field of Search .................. 252/184, 429 R, 430, 252/426, 441; 423/179.5, 463, 181, 157; 210/38 A

[56] References Cited

U.S. PATENT DOCUMENTS

| | | | |
|---|---|---|---|
| 2,683,124 | 7/1954 | D'Alecio | 252/426 |
| 2,839,569 | 6/1958 | Klamer | 252/426 |
| 3,578,609 | 5/1971 | Haag et al. | 252/430 |
| 3,755,393 | 8/1973 | Kniese et al. | 252/429 R |
| 4,116,857 | 9/1978 | Lee et al. | 423/179.5 |

*Primary Examiner*—Earl C. Thomas
*Assistant Examiner*—Wayne A. Langel
*Attorney, Agent, or Firm*—W. J. Lee

[57] ABSTRACT

Magnesium values are selectively recovered from salt brines, even salt brines which contain competing ions such as $Li^+$, $Ca^{++}$, and $Sr^{++}$, by contacting the brine with an anion exchange resin which has dispersed therein a microcrystalline structure of the formula $MgX_2.2Al(OH)_3$, where X is a halide.

5 Claims, No Drawings

COMPOSITION FOR RECOVERY OF MG++ FROM BRINES

CROSS-REFERENCE TO RELATED APPLICATION

This is a divisional of application Ser. No. 939,544 filed Sept. 5, 1978 (now U.S. Pat. No. 4,183,900) which is, itself, a divisional application of Ser. No. 812,542 filed July 8, 1977, (now U.S. Pat. No. 4,116,857).

In our related applications Ser. No. 812,543, filed July 5, 1977 now U.S. Pat. No. 4,116,858) and Ser. No. 812,534, filed July 5, 1977 (now U.S. Pat. No. 4,116,856) there is disclosed the preparation of an anion exchange resin having suspended therein a microcrystalline structure of the formula $LiX.2Al(OH)_3$, where X is a halide. The exchange resin is useful for selectively removing $Li^+$ values from salt brines, including brines which contain $Mg^{++}$ and other competing ions. These related co-filed applications are incorporated herein by reference. This present invention differs from the related co-filed applications by selectively removing $Mg^{++}$ from salt brines which may contain $Li^+$ and other competing ions.

BACKGROUND OF THE INVENTION

There are various salt brines which contain $Mg^{++}$ values, such as natural brines, ore leachings, process streams, geothermal brines, etc. In some brines, the $Mg^{++}$ values may be recovered by such means as solvent extraction or precipitation, or by the use of cation exchange resins to take $Mg^{++}$ values from the brine solution.

In brines which contain significant amounts of competing ions such as $Li^+$, $Ca^{++}$, $Sr^{++}$, or $Ba^{++}$, it is usually difficult to extract the $Mg^{++}$ values without extracting competing ions along with it.

There are various prior art methods involving ion exchange resins which pertain to extracting or recovering $Mg^{++}$ values from salt brines, e.g., U.S. Pat. No. 3,615,181; U.S. Pat. No. 2,772,143; and U.S. Pat. No. 2,387,898.

U.S. Pat. No. 3,615,181 pertains to the use of cation exchange resins for extracting $Mg^{++}$ from seawater.

U.S. Pat. No. 2,772,143 pertains to the use of cation exchange resins for extracting $Mg^{++}$ from seawater after removing $Ca^{++}$ from the seawater.

U.S. Pat. No. 2,387,898 pertains to the use of a base exchange resin to extract $Mg^{++}$ from brine, followed by a brine elution to remove the $Mg^{++}$ from the resin by replacing it with another metal.

SUMMARY OF THE INVENTION

A particulate anion exchange resin is provided with alumina hydrate, $Al(OH)_3$, dispersed therein. The resin/$Al(OH)_3$ composite is then reacted with $MgX_2$, contained in brine, at elevated temperature to form microcrystalline $MgX_2.2Al(OH)_3$ where X is a halide. After having a portion of the $MgX_2$ removed by elution with an aqueous wash, especially water having a small amount of $MgX_2$ dissolved therein, the resin is useful in extracting or recovering $Mg^{++}$ from salt brines, including brines which contain $Li^+$, $Ca^{++}$, $Sr^{++}$, $Ba^{++}$ or other competing metal ions. Once the resin is substantially loaded with $MgX_2$, a portion of the $MgX_2$ may be eluted again to re-activate the resin. The resin is re-usable numerous times to remove $Mg^{++}$ from brine in a two-stage cyclic process in which elution of a portion of $MgX_2$ from the resin is one of the stages.

Throughout this disclosure, X is used to denote a halide, with chloride being the preferred halide. As used herein, the term "microcrystalline" is used to indicate small crystals (formed in small pores, voids, and spaces in the resin) which are detectable by X-ray diffraction, if not by a microscope. The expression "dispersed therein" or "suspended therein" means the microcrystals are within the resin structure, not merely on the surface of the beads.

DETAILED DESCRIPTION OF THE INVENTION

The anion exchange resin may be of the weak base or strong base variety, such as those described in co-filed application Ser. No. 812,543 (now U.S. Pat. No. 4,116,858) identified supra. Of particular interest are those comprising crosslinked styrene/divinyl benzene polymers having affixed thereto amine or quaternary ammonium groups, though other water-insoluble, water-swellable anion exchange resins are operable. The resin with which one starts may be of the $OH^-$ variety or of the halide salt variety. Macroporous anion exchange resins are preferred over the gel type resins. Some of the publications which teach the properties and uses of anion exchange resins are, for Example, *The Kirk-Othmer Encyclopedia of Technology* and a book titled *Ion Exchange* by Friedrich Helfferich, published in 1962 by McGraw-Hill Book Company. Many ion exchange resins have been made commercially available under such tradenames as AMBERLITE, AMBERLYST, DOWEX, DUOLITE, and IONAC.

Detailed information about pore sizes of "gel-type", "microreticular", and "macroreticular" ion exchange resins may be found in *Ion Exchange in The Process Industries* published in 1970 by The Society of Chemical Industry, 14 Belgrave Square, London, S.W,1, England.

A particularly useful resin for use in the present invention is one such as is available commercially under the tradename DOWEX MWA-1. It is a macroporous, weakly basic, anion exchange resin of particle size about 20–50 mesh (U.S. Standard Sieve), each particle having about 30–40% porosity and an internal surface area of about 30–50 m$^2$/gm. Thus, each particle is composed of innumerable microparticles of about 200–1000 A° size. The resin phase is a highly crosslinked sytrene/divinylbenzene polymer (about 6–20% divinylbenzene) with $-CH_2N(CH_3)_2$ groups affixed to the benzene rings. The base capacity is about 4.2–4.3 meq./gm. of dry resin in its basic (or free amine) form. The base strength, as measured by a glass electrode in 26% NaCl, is $pK_b = 4 \times 10^{-7}$ (mid-point in acid-base titration curve is pH 7.6).

The $Al(OH)_3$ dispersed in the resin may be amorphous and may be formed by incorporating $AlCl_3$ into the resin and then treating it with $NH_4OH$ to cause precipitation of $Al(OH)_3$ within the resin. This is done, for example, by thoroughly contacting the resin with an $AlCl_3$ aq. solution, preferably a concentrated solution, decanting or draining off excess aq. $AlCl_3$, then thoroughly contacting the resin/$AlCl_3$ composite with aqueous ammonia, preferably conc. $NH_4OH$, thereby converting the $AlCl_3$ to $Al(OH)_3$. Following that it is best to wash away excess $NH_4OH$, $NH_4Cl$, and $Al(OH)_3$ which may have formed on the external surfaces of the resin particles rather than dispersed or suspended within the particles.

Then at a pH in the range of about 5.5 to about 9.0, preferably about 6 to about 8, aq. $MgX_2$ is reacted, at elevated temperature, with the $Al(OH)_3$ to form microcrystalline $MgX_2.2Al(OH)_3$. The crystallinity is confirmed by X-ray diffraction patterns.

The temperature used for reacting the MgX with the $Al(OH)_3$ to form microcrystalline $MgX_2.2Al(OH)_3$ within the resin is at least about 50° C. with reflux temperature being preferred. The period of time for such heating may range from about one hour at reflux temperature to 16 hours or more at 50° C. Temperatures above normal reflux temperature may be reached by confining the mixture under autogenous pressure, in which case a shorter heating period may be used. At temperatures much below 50° C. one is likely to encounter little or no yield of the desired $MgX_2.2Al(OH)_3$ and inordinate amounts of heating time are required.

The amount of $MgX_2$ employed in forming the $MgX_2.2Al(OH)_3$ should be enough, stoichiometrically, to convert most, if not all, of the $Al(OH)_3$ to the desired microcrystalline form. Generally, it is difficult to convert more than about 85-90% of the $Al(OH)_3$ to $MgX_2.2Al(OH)_3$ because not all of the $Al(OH)_3$ is easily reached by the $MgX_2$. It is usually best to employ an excess of the $MgX_2$ during the step of forming the $MgX_2.2Al(OH)_3$.

The range of Al content in the resin is generally about 0.3 to about 1.9 mole of Al per mole of N. To approach maximum loadings of Al in the resin, it is sometimes desirable to make multiple applications of the $AlCl_3$, followed after each application by treatment with $NH_3$ to convert it to $Al(OH)_3$. Also, it may be found to be sometimes advantageous to make multiple applications of hot $MgX_2$ whereby the $Al(OH)_3$ is converted to crystalline $MgX_2.2Al(OH)_3$ in the resin.

When first made, the resin/aluminate product contains up to 0.5 mole Mg per mole of Al to satisfy the formula $MgX_2.2Al(OH)_3$. During water elution, this ratio drops, but not to zero $Mg^{++}$. The operable range in the degree of neutralization of the base groups in the resin is broad and may be in the range of about 10-95% in the $Cl^-$ or acid form, preferably above about 50%, and is ordinarily in the range of about 50-80%.

The following examples are to demonstrate particular embodiments of the invention, but the invention is not limited to the particular embodiments demonstrated.

EXAMPLE 1

Preparation of $MgCl.2Al(OH)_3$ in a resin

This example is a generalized demonstration of the preparation of microcrystalline $MgCl_2.2Al(OH)_3$ suspended in a particulate, anion exchange resin, DOWEX MWA-1.

STEP 1

The resin, as normally manufactured and shipped, is moist and is in its basic, or free amine, form. It may be used in either the base form or converted to the acid $Cl^-$ form. If the acid $Cl^-$ form is desired, it may be stirred with excess 5-10% aq. HCl for several minutes and then washed with water. It is best if the pores, voids, and spaces in the resin are kept full of liquid so as to avoid having gas (air) occluded in the tiny spaces. If the resin has been allowed to become substantially dry, it is recommended that the air or gas be "pulled" out of the resin by the use of reduced pressure and then backfill the vacancies with liquid.

STEP 2

A unit weight of the dried resin from Step 1 is thoroughly contacted with aq. $AlCl_3$, preferably concentrated $AlCl_3$. If the resin is in its base form, it is easier to approach maximum loading if a highly concentrated aq. $AlCl_3$ is used. For this resin, a ratio of 35 parts dry resin to 27.5 parts $AlCl_3$ (dry basis) is near optimum for one-step loading of the resin. The damp, sandy-looking resin which results is then dried with an air flow until the effluent air is at ambient temperature, thus indicating that rapid vaporization of moisture has ended. This drying step is recommended because it allows air to fill the voids between porous particles causing the $AlCl_3$ solution to concentrate in the water-swollen resin phase. Continued drying causes evaporation of the water from the resin phase, thereby shrinking the microparticles and capturing the $AlCl_3$ within the resin phase. Thus it can be seen that the extent to which the $AlCl_3$ is dispersed in the resin phase, as opposed to being trapped in the void spaces among the resin particles, is largely dependent on the extent of drying. For operability, it is only necessary to dry to the point of air-filling the interstices, but continued drying to remove water from the water-swollen microparticles is preferred. With room temperature air drying, constant weight is achieved at about 3-5% $H_2O$ remaining in the resin, whereas with only enough drying to fill the interstices with air, the amount of $H_2O$ remaining in the resin is about 20-25%. For operability, it can be seen that drying to a water concentration of about 25% or less is preferred.

STEP 3

In this step the $AlCl_3$ is converted to $Al(OH)_3$ as an amorphous solid, predominantly within the resin phase. A quantity of $NH_4OH$ is used equivalent to the $AlCl_3$ (3 moles/mole) plus the amount required to convert the resin to its basic form (usually about 20-60%). The concentration of the aq. $NH_4OH$ is preferably as high as possible to achieve uniform wetting of the resin particles.

STEP 4

In this step the $Al(OH)_3$ is converted to $MgCl_2.2Al(OH)_3$ by being treated with aq. $MgCl_2$ at elevated temperature. The treatment is conveniently done in batch form or column treatment with $MgCl_2$ brine. For best results there should be at least one mole of Mg per mole of Al during the treatment step; the object is to convert the $Al(OH)_3$ to a microcrystalline $MgCl_2.2Al(OH)_3$ complex, not to re-dissolve the Al as $AlCl_3$. By using highly concentrated brines, and by not letting the pH get too far into the acid range, solubility of the Al is suppressed and formation of the desired complex is enhanced. The elevated temperature is preferably reflux temperature and the time at reflux is preferably one hour or more. Lower temperatures require longer times and at about 50° C., several hours, sometimes as much as 16 hours or more, should be used. It is usually best to hold the resin, containing the $Al(OH)_3$ or the $MgCl_2.2Al(OH)_3$, suspended in a concentrated brine solution of, say, 26% NaCl if it is to be stored between treatments. The suspending brine can then be easily washed out or replaced by the liquid being used in a subsequent step, cycle, or treatment.

Following the hot treatment with $MgCl_2$, the formation of microcrystalline $MgCl_2 \cdot 2Al(OH)_3$ within the resin may be confirmed by X-ray diffraction pattern analysis.

EXAMPLE 2

Use of the resin/aluminate composite

This is a generalized demonstration of the use of a resin/aluminate composite in accordance with the present invention.

The resin/aluminate composite prepared in accordance with the procedure of Example 1 is readied for use in extracting $Mg^{++}$ from brines by being washed with water to elute a portion of the $MgCl_2$ from the $MgCl_2 \cdot 2Al(OH)_3$ complex.

The resin is placed in a column and a flow of NaCl brine containing $MgCl_2$ and LiCl is passed through the resin bed. The first portion of the effluent is the water which was in the resin and which is being replaced by the brine. After that the brine becomes the effluent and by analysis it is seen that $MgCl_2$ is being held in the resin while the NaCl and LiCl comes on out. As the effective capacity of the resin is being approached, it is found that $MgCl_2$ is coming through, so the brine flow is stopped and a wash cycle is begun. The first portion of the effluent, after the wash cycle has begun, is the brine which was in the resin bed. After that the wash water comes out, carrying with it eluted $MgCl_2$. When the elution effluent begins to show only low amounts of $MgCl_2$, the wash is stopped and the brine flow is resumed. Thus, the alternate flows of wash and brine may be repeated numerous times.

EXAMPLE 3

This example employs a particulate, anion exchange resin of the type sold under the tradename DOWEX MWA-1.

Thirty-five grams of the resin is mixed with an aqueous solution comprising 45 gm of $AlCl_3 \cdot 6H_2O$ dissolved in 36 gm. $H_2O$. The mixture becomes a free-flowing solid within thirty minutes and is then air dried at about 25° C. by passing a flow of air through it. Final weight is about 77.9 gms. This product is poured into an aqueous solution prepared by diluting 40 ml. of 30% $NH_3$ with 10 ml. $H_2O$, thereby converting the $AlCl_3$ to $Al(OH)_3$. It is then rinsed twice with 100 ml. of $H_2O$, then 20 ml. of 30% $NH_3$ diluted with 80 ml. $H_2O$, then washed well with excess $H_2O$. After air drying at about 24° C., the product weighs about 50.83 gms. This is poured into a solution prepared by dissolving 25 gm. $AlCl_3 \cdot 6H_2O$ in 20 gm $H_2O$. After about 90 minutes the mixture is not free-flowing. After standing overnight, the dry crusty product is broken and air dried to 34.5° C. to yield 73.91 gms. of product.

The material thus prepared is added to a solution prepared by diluting 30 ml. of 30% $NH_3$ with 20 ml. of $H_2O$, then rinsed 4 times with 100 ml. each of 26% NaCl solution and then re-suspended in 150 ml. of 26% NaCl at pH 8.64 as determined by glass electrode. To this suspension is added 11 gm. of 70% $MgCl_2$ and the pH drops steadily to about 6.7 at 56° C. More 26% NaCl and 9 gm. of 70% $MgCl_2$ (pH 4.5) is added and then 5 ml. of 30% $NH_3$ is added to bring the pH to about 6.0. The mixture is refluxed for about one hour and then cooled overnight. Analysis indicates the resin now contains 0.2829 mole of Al and 0.123 mole of Mg. The resin/aluminate composite product comprises 153 ml. X-ray diffraction pattern analysis confirms the microcrystalline $MgCl_2 \cdot 2Al(OH)_3$ structure.

For a column test 116 ml. of the product resin is placed in a water-jacketed column to a resin bed depth of 73 cm. at a pH of 6.0. Smackover brine containing about 305 mg/liter $Li^+$, 0.152 moles of Mg per liter and 1.0 moles of Ca per liter is employed. Flow rates of 21 ml./minute for wash cycle and brine cycle are used and column temperature is controlled at 90° C.

A water flow of 350 ml. is used to elute $MgCl_2$, then Smackover brine feed is passed through the resin until analysis indicates the effluent contains about as much Mg as the influent feed. Then wash water is started again and 25 ml. cuts are taken and analyzed as follows:

TABLE I

| Cut No. | Lithium* mg/liter | Magnesium moles/liter | Calcium moles/liter | Ratio Mg/Ca | Remarks |
|---|---|---|---|---|---|
| 1 | 305 | 0.104 | 1.012 | 0.103 | held-up brine coming out |
| 2 | 305 | 0.072 | 1.02 | 0.070 | held-up brine coming out |
| 3 | 305 | 0.096 | 0.976 | 0.098 | held-up brine coming out |
| 4 | 228 | 0.256 | 0.524 | 0.488 | wash/brine mixture coming out |
| 5 | 95 | 0.280 | 0.132 | 2.12 | wash/brine mixture coming out |
| 6 | 40 | 0.212 | 0.036 | 5.89 | wash/brine mixture coming out |
| 7 | 25 | 0.164 | 0.016 | 10.25 | wash/brine mixture coming out |
| 8 | — | 0.114 | 0.008 | 14.25 | wash coming out |
| 9 | — | 0.0872 | 0.0068 | 12.82 | " |
| 10 | — | 0.07 | 0.002 | 35.00 | " |
| Feed | 415 | 0.152 | 1.0 | 0.152 | — |

*Approx. Li content; there is no Lithium interference with the $Mg^{++}$ pick-up.

We claim:

1. A composition of matter comprising crystalline $MgX_2 \cdot 2Al(OH)_3$, where X is a halide.

2. The composition of claim 1 wherein the crystalline $MgX_2 \cdot 2Al(OH)_3$ is supported by a substrate.

3. The composite of claim 2 wherein the substrate is a reticular or porous solid.

4. The composition of claim 2 wherein the substrate is a reticular or porous polymeric material.

5. The composition of claim 1, 2, 3, or 4 wherein X is chloride.

* * * * *

UNITED STATES PATENT AND TRADEMARK OFFICE
CERTIFICATE OF CORRECTION

PATENT NO. : 4,243,555
DATED : January 6, 1981
INVENTOR(S) : John M. Lee and William C. Bauman It is certified that error appears in the above-identified patent and that said Letters Patent are hereby corrected as shown below:

Column 1, line 10; change "July 8, 1977" to --July 5, 1977--.

Column 1, line 12; change "now" to --(now--.

Column 2, line 49; change "sytrene" to --styrene--.

Signed and Sealed this

Nineteenth Day of May 1981

[SEAL]

Attest:

RENE D. TEGTMEYER

Attesting Officer    Acting Commissioner of Patents and Trademarks